United States Patent
Smith et al.

(10) Patent No.: US 10,428,964 B2
(45) Date of Patent: Oct. 1, 2019

(54) SPHERICAL AUTOMATIC FLOW EMERGENCY RESTRICTOR (S.A.F.E.R.) VALVE

(71) Applicant: MIKRON VALVE & MANUFACTURER, INC., Erie, PA (US)

(72) Inventors: Patrick D. Smith, Erie, PA (US); Paul R. Ostand, Erie, PA (US); Joseph Caccavo, Erie, PA (US)

(73) Assignee: Mikron Valve & Manufacturer, Inc., Erie, PA (US)

( * ) Notice: Subject to any disclaimer, the term of this patent is extended or adjusted under 35 U.S.C. 154(b) by 323 days.

(21) Appl. No.: 15/034,864

(22) PCT Filed: Nov. 18, 2014

(86) PCT No.: PCT/US2014/066224
§ 371 (c)(1),
(2) Date: May 5, 2016

(87) PCT Pub. No.: WO2015/074075
PCT Pub. Date: May 21, 2015

(65) Prior Publication Data
US 2016/0281869 A1    Sep. 29, 2016

Related U.S. Application Data

(63) Continuation of application No. 14/083,418, filed on Nov. 18, 2013, now Pat. No. 9,377,113.

(51) Int. Cl.
*F16K 15/18* (2006.01)
*F16K 35/02* (2006.01)
(Continued)

(52) U.S. Cl.
CPC .......... *F16K 15/188* (2013.01); *F16K 5/0605* (2013.01); *F16K 17/285* (2013.01);
(Continued)

(58) Field of Classification Search
CPC ......... Y10T 137/7841; Y10T 137/8803; F16K 15/188; F16K 5/0605; F16K 17/285; F16K 17/30; F16K 35/025
See application file for complete search history.

(56) References Cited

U.S. PATENT DOCUMENTS

| | | | |
|---|---|---|---|
| 453,814 A * | 6/1891 | Loughry | ........... Y10T 137/5153 137/269.5 |
| 764,900 A | 7/1904 | Schalt | |

(Continued)

FOREIGN PATENT DOCUMENTS

| | | | | |
|---|---|---|---|---|
| CN | 101040138 A | 9/2007 | ............... | F16K 5/06 |
| CN | 101270820 A | 9/2008 | ............... | F16K 5/06 |

OTHER PUBLICATIONS

U.S. Appl. No. 14/083,418, Final Office Action dated Feb. 9, 2016, 13 pages.

(Continued)

*Primary Examiner* — Marina A Tietjen
*Assistant Examiner* — Frederick D Soski
(74) *Attorney, Agent, or Firm* — Bauer Law Offices; Robert M. Bauer (57) ABSTRACT

A ball check valve controls the flow of fluid with a sphere. A body has a fluid path and a recess for receiving the sphere in alignment with the fluid path. The sphere has a retainer which secures a ball check within it. When the valve is in a "Run" position and the rate of fluid flow increases excessively, the ball check seats in a narrow opening of the sphere, thus restricting the flow of fluid.

8 Claims, 12 Drawing Sheets

(51) Int. Cl.
*F16K 5/06* (2006.01)
*F16K 17/28* (2006.01)
*F16K 17/30* (2006.01)

(52) U.S. Cl.
CPC ............ *F16K 17/30* (2013.01); *F16K 35/025* (2013.01); *Y10T 137/7841* (2015.04); *Y10T 137/8803* (2015.04)

(56) References Cited

U.S. PATENT DOCUMENTS

| | | | |
|---|---|---|---|
| 1,677,562 A | 7/1928 | Lewis et al. | |
| 2,598,598 A | 5/1952 | Pierce | 137/153 |
| 3,006,602 A * | 10/1961 | Usab | F16K 5/0615 251/315.13 |
| 3,648,970 A | 3/1972 | Hartmann et al. | 251/104 |
| 3,830,693 A | 8/1974 | Beser et al. | 176/18 |
| 4,542,878 A | 9/1985 | Kulisek | 251/315 |
| 4,671,308 A | 6/1987 | Williams et al. | 137/72 |
| 4,690,169 A | 9/1987 | Jobe | 137/614.16 |
| 4,747,427 A | 5/1988 | Smith et al. | 137/270 |
| 5,263,685 A | 11/1993 | Winnike | 251/163 |
| 5,435,521 A | 7/1995 | Jarecki | 251/515.16 |
| 5,551,467 A * | 9/1996 | Booth | F16K 5/0605 137/1 |
| 5,586,579 A | 12/1996 | Diehl | 137/614.17 |
| 5,588,638 A | 12/1996 | Bunting et al. | 251/315.05 |
| 6,173,940 B1 | 1/2001 | Kardohely et al. | 251/283 |
| 7,059,585 B2 | 6/2006 | Dalluge et al. | 251/351.16 |
| 7,635,113 B2 * | 12/2009 | Bearer | F16K 5/0678 251/174 |
| 2003/0062497 A1 | 4/2003 | Paine | 251/148 |
| 2005/0022872 A1 * | 2/2005 | Robison | F16K 5/0407 137/460 |
| 2008/0135794 A1 * | 6/2008 | Shnider | B60R 25/08 251/315.1 |
| 2011/0253922 A1 | 10/2011 | Hughes et al. | 215/315.01 |
| 2014/0060128 A1 * | 3/2014 | Fuller | F16K 35/10 70/211 |

OTHER PUBLICATIONS

U.S. Appl. No. 14/083,418, AFCP 2.0 Request dated Mar. 30, 2016, 7 pages.
U.S. Appl. No. 14/083,418, Applicant's Interview Summary Record and Comments on Statement of Reasons for Allowance dated May 5, 2016, 2 pages.
China Patent Application No. 201480073383.3, Office Action dated Jan. 3, 2018 (4 pages), with translation (7 pages).
China Patent Application No. 201480073383.3, Search Report dated Dec. 25, 2017, 2 pages.

* cited by examiner

SPHERICAL AUTOMATIC FLOW EMERGENCY RESTRICTOR (S.A.F.E.R.) VALVE

CROSS REFERENCE TO RELATED APPLICATIONS

The present invention is filed under 35 U.S.C. § 371 as the U.S. national phase of International Application No. PCT/US2014/066224, filed Nov. 18, 2014, which designated the U.S. and claims priority to U.S. patent application Ser. No. 14/083,418, filed Nov. 18, 2013, all of which are incorporated by reference.

FIELD OF THE INVENTION

The invention relates generally to valves. In particular, the invention relates to ball check valves.

BACKGROUND

In the petroleum and some other industries, it is sometimes necessary to store large quantities of heavy fluids in a large container and keep an accurate measurement of the amount of fluid within the container. In order to accomplish this task, a sight gage is often used. The level of the fluid is measured by an upper inlet passageway and lower outlet passageway which may be connected to a cylinder which may have a glass wall or window which may be calibrated to indicate the level of the fluid within the container. The glass is susceptible to breakage and leakage especially in an industrial situation. This could lead to a serious leakage of the fluid if left unchecked. It is desired to stop the leak because the fluid may be hazardous, expensive or for cleanliness generally.

A ball check valve has conventionally been employed in the upper and lower passageway of a sight gage which will seat in the passageway when there is breakage or other significant leakage. If the fluid begins to excessively flow towards the sight gage, the ball check valve obstructs the flow of the fluid and thus prevents the leakage of the fluid.

An early example of a ball check valve is disclosed in U.S. Pat. No. 3,113,587 issued on Dec. 10, 1963 to L. A. Hendley. The ball check is normally in a resting position that permits free flow of fluid as shown in FIG. 2 of the patent. If there is excessive flow, the ball check has to be moved to a seated position as shown in FIG. 2A of the patent that should block the flow. The ball should move from the resting position to the blocking position at a situation of excess flow. When the ball is in the blocking position, the inlet pressure maintains the ball check in that position.

Ball check valves are susceptible to leakage, breakage and jamming after repeated use. Ball check valves can also be unreliable in operation, particularly for certain fluids such as petroleum. There may be a buildup on interior surfaces of the valve or a contaminant can become lodged between an interior surface and the ball. In severe cases, the valve may become inoperative due to the ball check not seating properly, allowing fluid to flow past the ball check.

BRIEF SUMMARY

It is an objective of the preferred embodiments of the invention to provide a ball check valve for controlling the excess flow of fluid that overcomes the aforementioned disadvantages. A sphere in the valve has a flow passage, and there is a ball check within the flow passage. The valve body has a fluid path and a recess in the body receiving the sphere such that it is aligned with the fluid path of the body. A rotating stem mounted on the body of the valve has a tab sized to fit a slot on the top of the sphere and to rotate the sphere in conjunction with the stem. One preferred embodiment of the invention has a unique locking end piece to enable the valve to withstand higher pressures.

BRIEF DESCRIPTION OF THE DRAWINGS

A complete understanding of the preferred embodiments will be obtained from the following description when taken in connection with the accompanying drawing figures, wherein like reference numerals identify the same parts throughout.

DETAILED DESCRIPTION OF THE PREFERRED EMBODIMENTS

Figure 1:
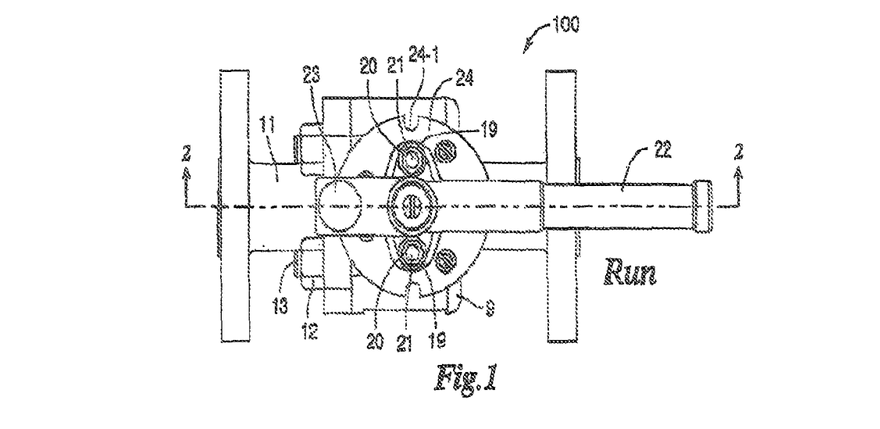
FIG. 1 is a top view of a valve according to a first preferred embodiment of the invention, shown in the "Run" position.
Figure 2:
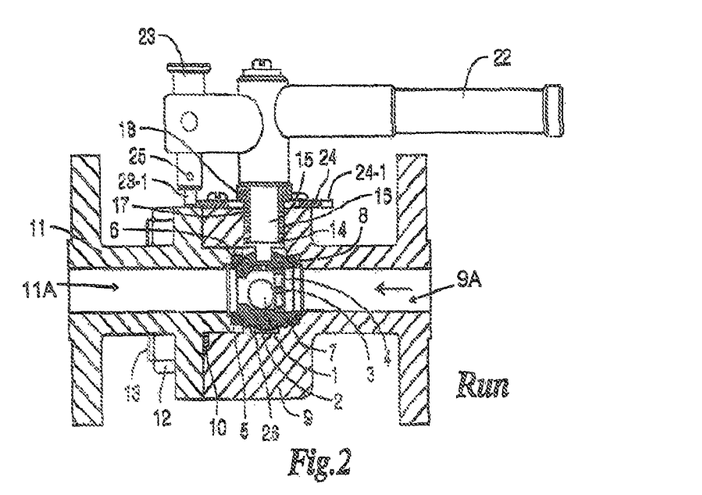
FIG. 2 is a side cross-sectional view of the valve along line 2-2 in FIG. 1 with the valve in the "Run" position.
Figure 2A:
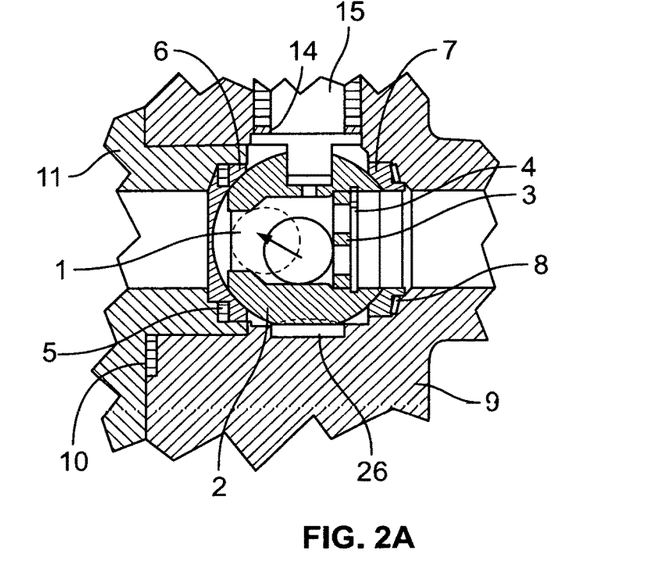
FIG. 2A is an exploded side cross-sectional view of the valve in FIG. 2 showing the resting position of the ball in solid outline and the position of the ball when seated to block fluid flow in dashed outline.
Figure 3:
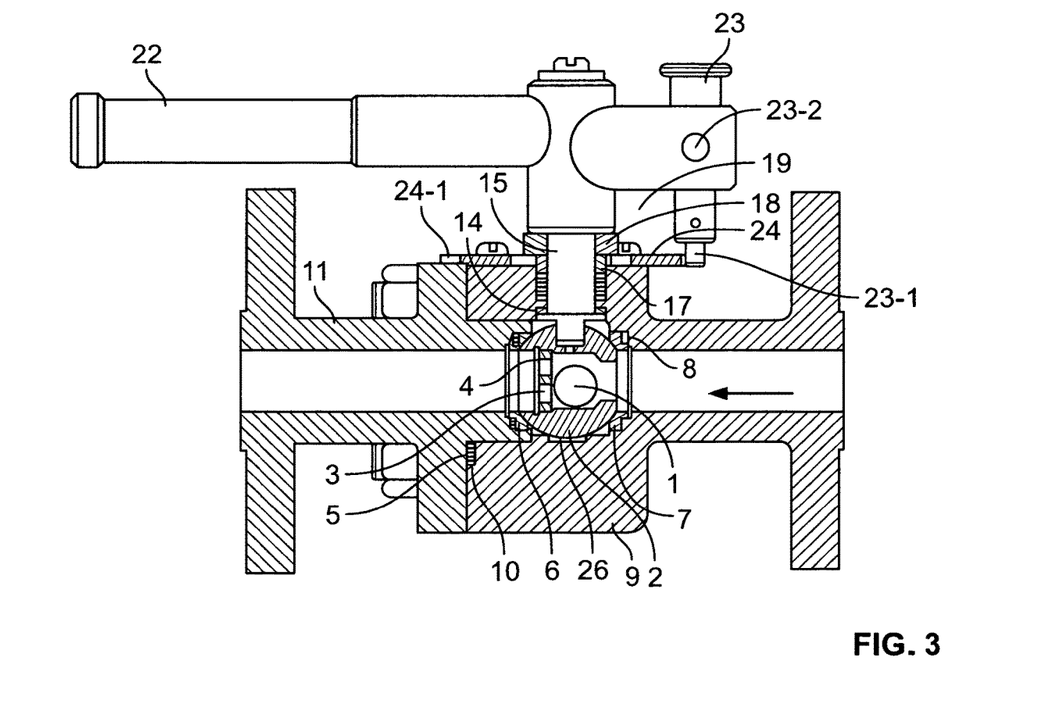
FIG. 3 is a side cross-sectional view of the valve in FIG. 1 with the valve in the "Bypass" position.

A first preferred embodiment of the invention is shown in FIGS. 1-16 with reference to the following listing of constituent parts:
100 valve
1 ball check
2 sphere
3 retainer
4 retainer clip
5 seat gasket
6 downstream seat
7 guide seat
8 disc spring
9 body
10 body gasket
11 end
12 nut
13 stud
14 thrust washer
15 stem
16 stem packing
17 gland ring
18 gland follower
19 belleville washer
22 handle
23 guide post
24 locking plate
25 stop pin The first preferred embodiment of the valve according to the invention utilizes a body 9 and end part 11, with aligned fluid paths as shown in FIGS. 2-3. Body 9 and end 11 are of materials commensurate with the application, for example stainless steel or black oxide coated carbon steel. The valve is assembled by placing sphere 2 into a recess in body 9. The recess is formed so that the sphere 2 fluid path aligns with the fluid path 9A of body 9 and fluid path 11A of end 11.

Preferably, a guide seat 7 is provided to align and fit the sphere 2 to body 9, and a disc spring 8 biases the guide seat against sphere 2. The curved surface of guide seat 7 mates the curved surface of sphere 2. A downstream seat 6 and seat gasket 5 fit and align the sphere 2 to end 11. The curved surface of downstream seat 6 mates the outer curve of sphere 2. The seat materials may be commensurate with the application, for example, metal or soft-seated. As shown in FIGS. 2, 2A, 3 and 10, there may be a notch, undercut or indentation 26 in the body cavity to facilitate the assembly of the stem into the body. It is preferably as narrow as necessary to accommodate the stem Body 9 and end 11 can be joined in any suitable manner, but preferably with nuts 12 and 13 as shown in FIGS. 1 and 2.

Figure 4A:
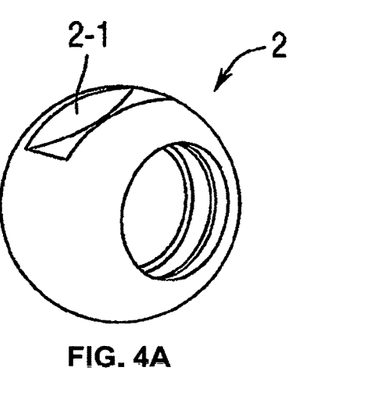
FIG. 4A is a perspective view of the sphere of the valve in FIG. 1.
Figures 4B, 5B:
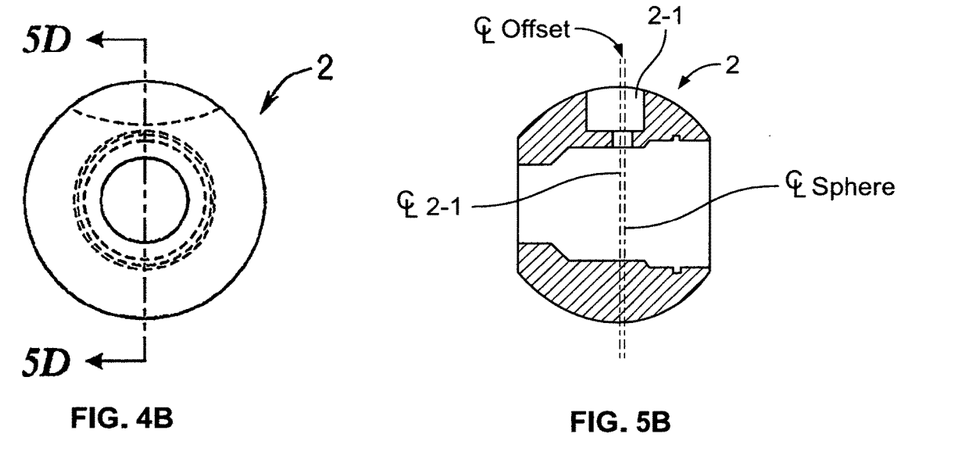
FIG. 4B is a view showing one opening of the sphere shown in FIG. 5A in solid lines, the offset concave slot on the top of the sphere in dashed line, and the other opening and parts in dashed lines.
FIG. 5B is a cross-sectional view of the sphere in FIG. 4B along the line 5D-5D shown in FIG. 4B.
Figure 5A:
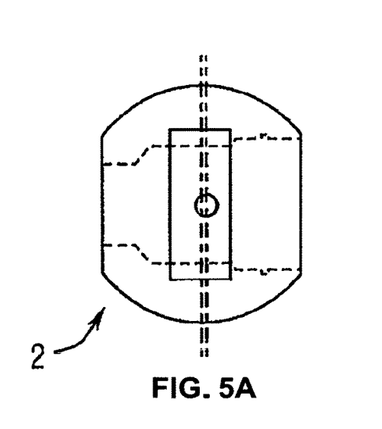
FIG. 5A is a top view of the sphere shown in FIG. 4A with the concave slot offset from the pivot point in solid line, and the valve cavity of the sphere in dashed lines.
Figure 6A:
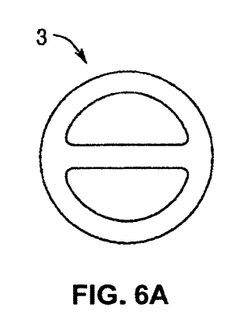
FIG. 6A is an end view of the retainer 3 in the valve shown in FIG. 2A.
Figure 6B:
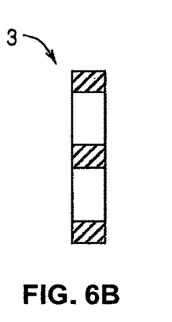
FIG. 6B is a cross-sectional view of the retainer in FIG. 6A.
Figure 7A:
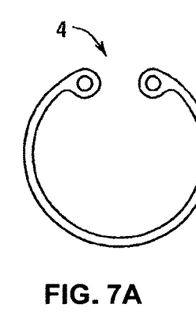
FIG. 7A is an end view of the retainer clip 4 in the valve shown in FIG. 2A.
Figure 7B:
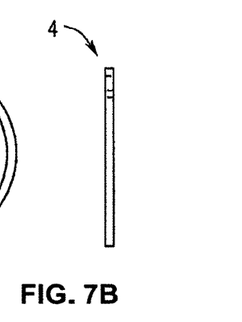
FIG. 7B is a cross-sectional view of the retainer clip in FIG. 7A.
Figure 8A:
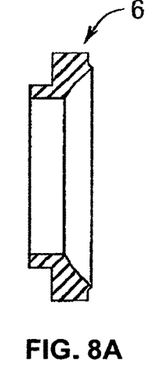
FIG. 8A is a cross-section view of the downstream seat 6 shown in the valve in FIG. 2A.
Figure 8B:
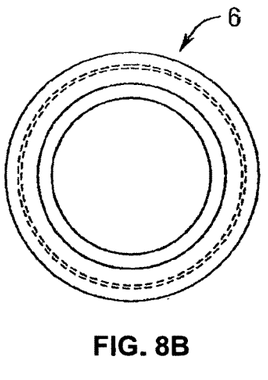
FIG. 8B is an end view of the downstream seat 6 in FIG. 8A.
Figure 9A:
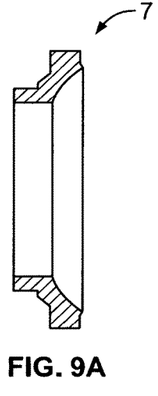
FIG. 9A is a cross-section view of the guide seat 7 in the valve shown in FIG. 2A.
Figure 9B:
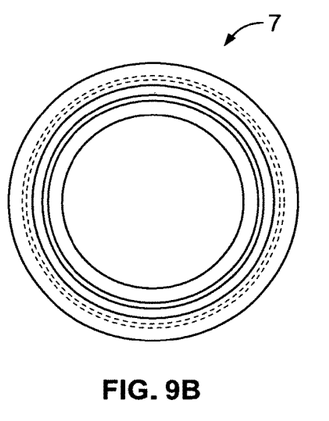
FIG. 9B is an end view of the guide seat 7 in FIG. 9A.
Figure 10:
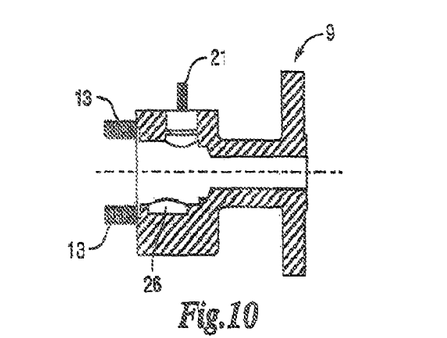
FIG. 10 is a cross-sectional view of body 9 according to the first preferred embodiment of the invention.
Figure 11:
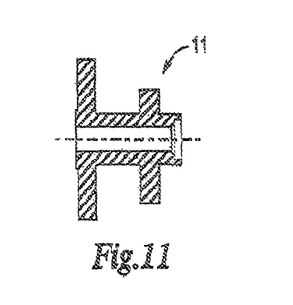
FIG. 11 is a cross-sectional view of end 11 according to the first preferred embodiment of the invention.
Figure 13A:
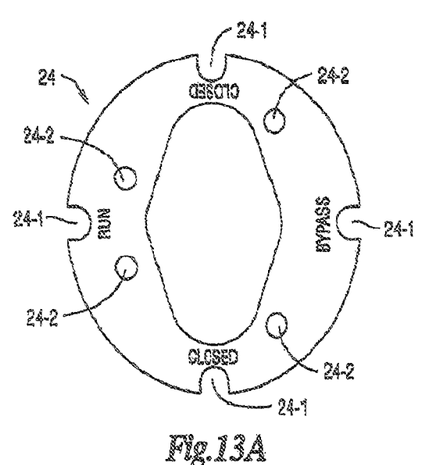
FIG. 13A is at top view of a locking plate 24 in the first preferred embodiment of the valve shown in FIG. 1.

The sphere 2 is operated by stem 15 in conjunction with thrust washer 14, stem packing 16, gland ring 17, gland follower 18, Belleville washers 19, packing nuts 20 and packing studs 21. As shown in FIGS. 4-5, sphere 2 has a concave slot at the top which receives the lower portion 15*b* of stem 15. The stem 15 preferably uses "ultra-low emission" packing and is rotated using handle 22 to rotate sphere 2. As best seen in FIG. 13A, the valve provides a "Run", "Bypass" and two "Closed" positions. The "Bypass" position shown in FIG. 3 allows the fluid to flow freely around the ball check in order to evaluate for blockage, flushing and proper operation of the fluid system. The handle 22, stem 15 and sphere 2 can be rotated substantially 180 degrees to the "Run" position shown in FIGS. 1 and 2. If the sight gage or piping to which the valve is connected downstream should be compromised or leaking, the resulting fluid dynamics of the outflow will cause the ball check 1 in sphere 2 to move from the resting position (shown by solid lines in FIGS. 2 and 2A) to the blocking position (shown by dashed lines in FIG. 2A). If handle 22 is rotated 90 degrees (in either direction), then the valve is in a "Closed" position (not shown in the drawings) in which the sphere 2 does not align with the fluid paths in body 9 and end 11, and the valve thus isolates fluid flow on either side of the valve. The geometry allows for two opposed "Closed" positions and the non-symmetrical pattern of holes 24-2 prevents improper assembly of the locking plate 24.

Figure 12A:
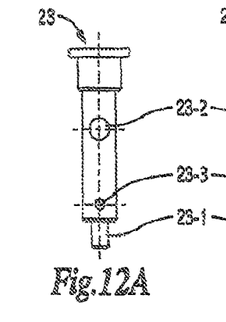
FIG. 12A is a view of a guide post 23 in the first preferred embodiment of the valve in FIG. 1 which shows a guide tip 23-1 of guide post 23, a hole 23-2 for a possible lock or locking pin and hole 23-3 for a stop pin 25.
Figure 12B:
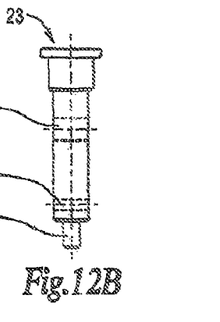
FIG. 12B is a view of guide post 23 in which guide post 23 is turned 90 degrees from the view shown in FIG. 12A.
Figure 13B:
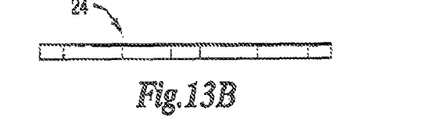
FIG. 13B is a side view of the locking plate 24 shown in FIG. 13A.
Figure 14A:
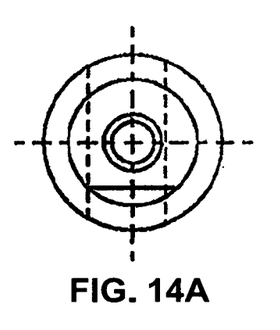
FIG. 14A is a top view of the stem 15 in the first preferred embodiment of the valve shown in FIG. 1.
Figure 14B:
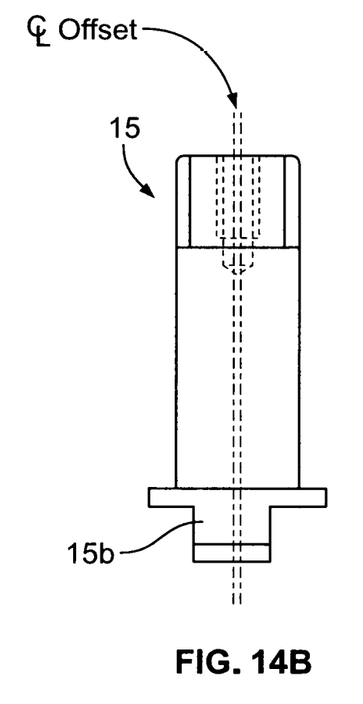
FIG. 14B is a side view of stem 15 in FIG. 14A showing the end of a tab 15*b* that engages with the top slot of sphere 2 and that is offset with respect to the center of stem 15.
Figure 14C:
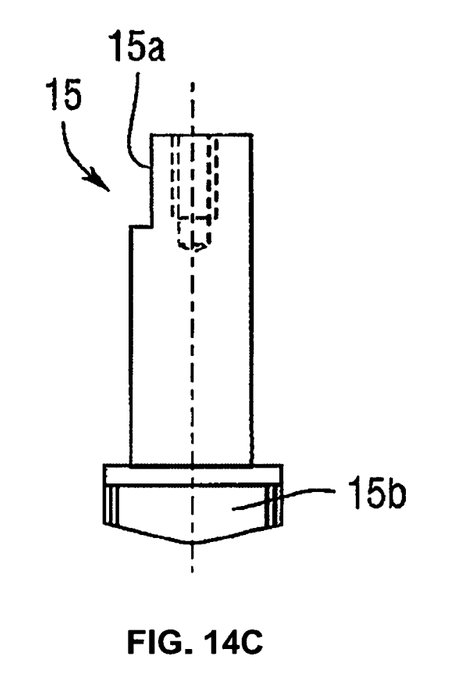
FIG. 14C is a side view of stem 15 in FIG. 14A showing the side of the tab 15*b* that engages with the top slot of sphere 2 and that is offset with respect to the center of stem 15.
Figure 15A:
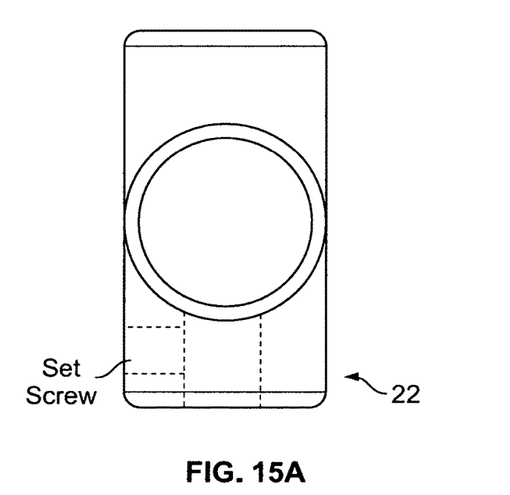
FIG. 15A is an end view of the handle 22 in the first preferred embodiment of the valve shown in FIG. 1.
Figure 15B:
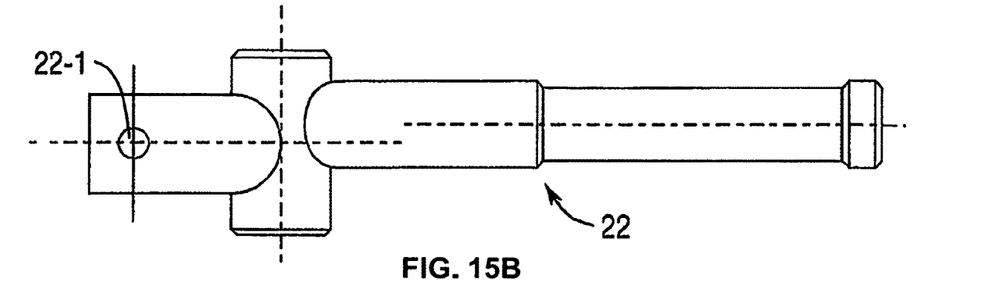
FIG. 15B is a side view of the handle 22 in the first preferred embodiment of the valve shown in FIG. 1.
Figure 15C:
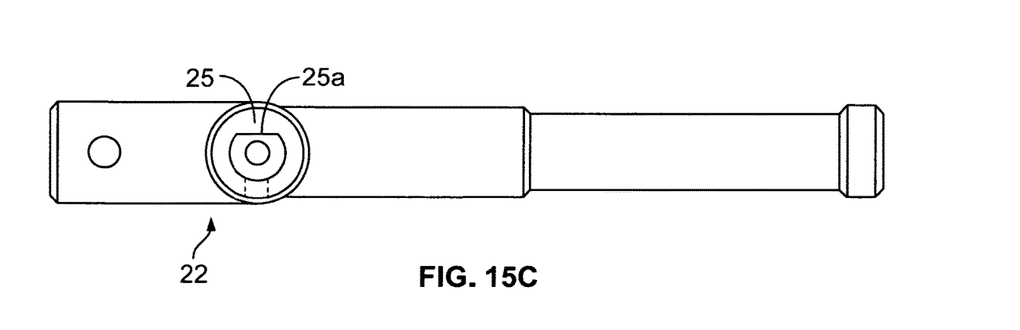
FIG. 15C is a bottom view of the handle 22 in the first preferred embodiment of the valve shown in FIG. 1.
Figure 16A:
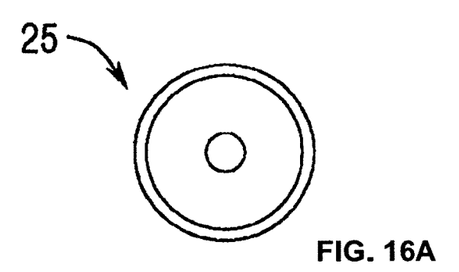
FIG. 16A is a view of the hub 25 for handle 22 in the first preferred embodiment of the valve shown in FIG. 1.
Figure 16B:
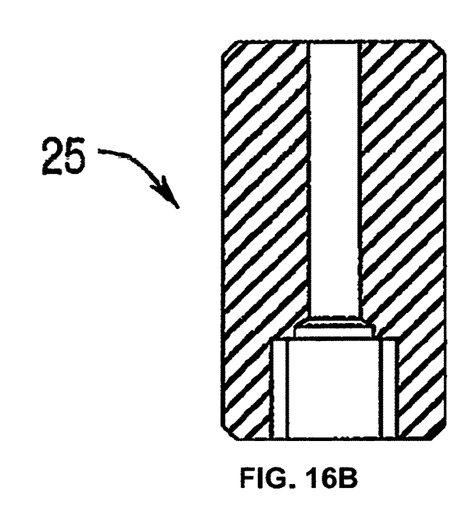
FIG. 16B is a cross-sectional view of hub 25 along line 16B-16B shown in FIG. 16D.
Figure 16C:
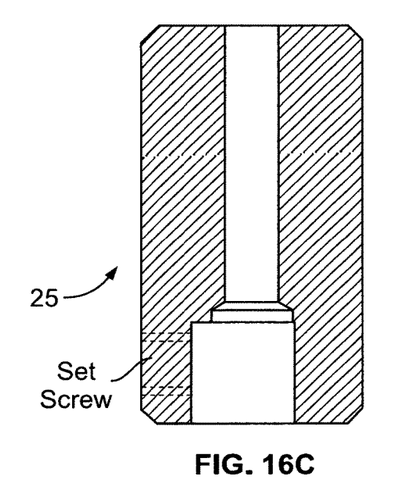
FIG. 16C is a cross-sectional view of hub 25 along line 16C-16C shown in FIG. 16E.
Figure 16D:
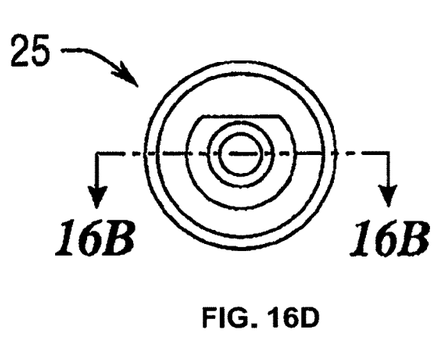
FIG. 16D is a bottom view of hub 25 shown in FIG. 16A.
Figure 16E:
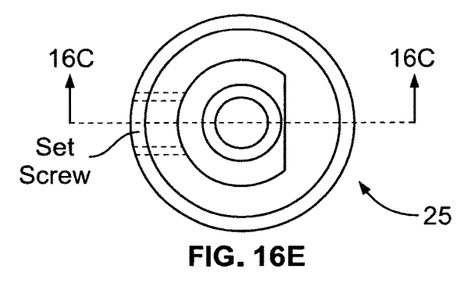
FIG. 16E is a bottom view of hub 25 at a 90 degree rotation from the bottom view of hub 25 shown in FIG. 16D.

The preferred embodiment shown in FIG. 1 uses a locking plate 24 as shown in FIGS. 13A and 13B. Notches 24-1 on the periphery of guide plate 24 correspond to the "Bypass", "Run" and "Closed" positions. A guide post 23 on the opposite side from handle 22 slides vertically so that tip 23-1 can engage one of the notches on the periphery of guide plate 24. Thus, in order to change the valve position, it is not sufficient to merely rotate handle 22; guide post 23 must first be lifted to clear the corresponding notch. A hole 23-2 is provided through guide post 23 and aligns with hole 22-1 in handle 22. A lockpin or padlock can be provided in hole 23-2 and through hole 22-1 in handle 22 to prevent the guide post 23 from being lifted to clear the notch on locking plate 24. An exemplary guide post is shown in FIGS. 12A and 12B.

As shown in FIGS. 4-5 and 14B-14C, the slot 2-1 in sphere 2 and the tab 15*b* at the bottom of stem 15 are equally offset from center. The amount of offset may be relatively slight or not. The asymmetric alignment of locking plate mounting holes 24-2 align locking plate 24, and the engraved lettering correctly with respect to the sphere 2, stem 15 and handle 22. The flat 15*a*, likewise locates on flat 25a, which aligns the stem to the handle. These prevent the valve from being assembled incorrectly with the handle in an incorrect orientation. The sphere can be rotated freely about the axis of the stem but the positions thereof are preferably determined by the notches in the locking plate 24. The exploded view of FIG. 2A shows the valve in the "Run" position. The interior space of sphere 2 is configured so that the resting position of the ball is shown by a solid outline. The ball check 1 is confined within one end of sphere 2 while fluid is allowed to pass by a retainer 3 secured by a retainer clip 4. Preferably, retainer 3 is in circular form and nests into a counter bore, and retainer clip 4 is located in an adjacent groove, in sphere 2. Preferred embodiments of the retainer 3, with a member across its face to provide two "D" shaped passages, and retainer clip 4 are shown in FIGS. 6A, 6B, 7A and 7B, but other embodiments may be utilized as well. Although retainer 3 is shown in a horizontal position in the drawings, the retainer 3 preferably can rotate within the groove in sphere 2.

When the fluid flow rate is excessive fluid dynamics will cause ball check 1 to be moved from its resting position and become seated in the narrow opening of sphere 2 at the position indicated by the dashed outline in FIG. 2A.

The seat gasket 5, downstream seat 6, guide seat 7 and disc spring 8 are used for sealing and securing the position of sphere 2 and supporting it during rotation between different positions. They play no part in restraining the ball check 1 within sphere 2. Both the ball check 1 and the sphere 2 are preferably comprised of smooth finished material to reduce resistance to movement of the ball and clogging of the valve by viscous fluids. A ball check valve according to this first preferred embodiment thus overcomes the disadvantages of previously know valves, and is especially useful for controlling the flow of a heavy fluid, such as petroleum, in a system with a site gage.

Figure 17:
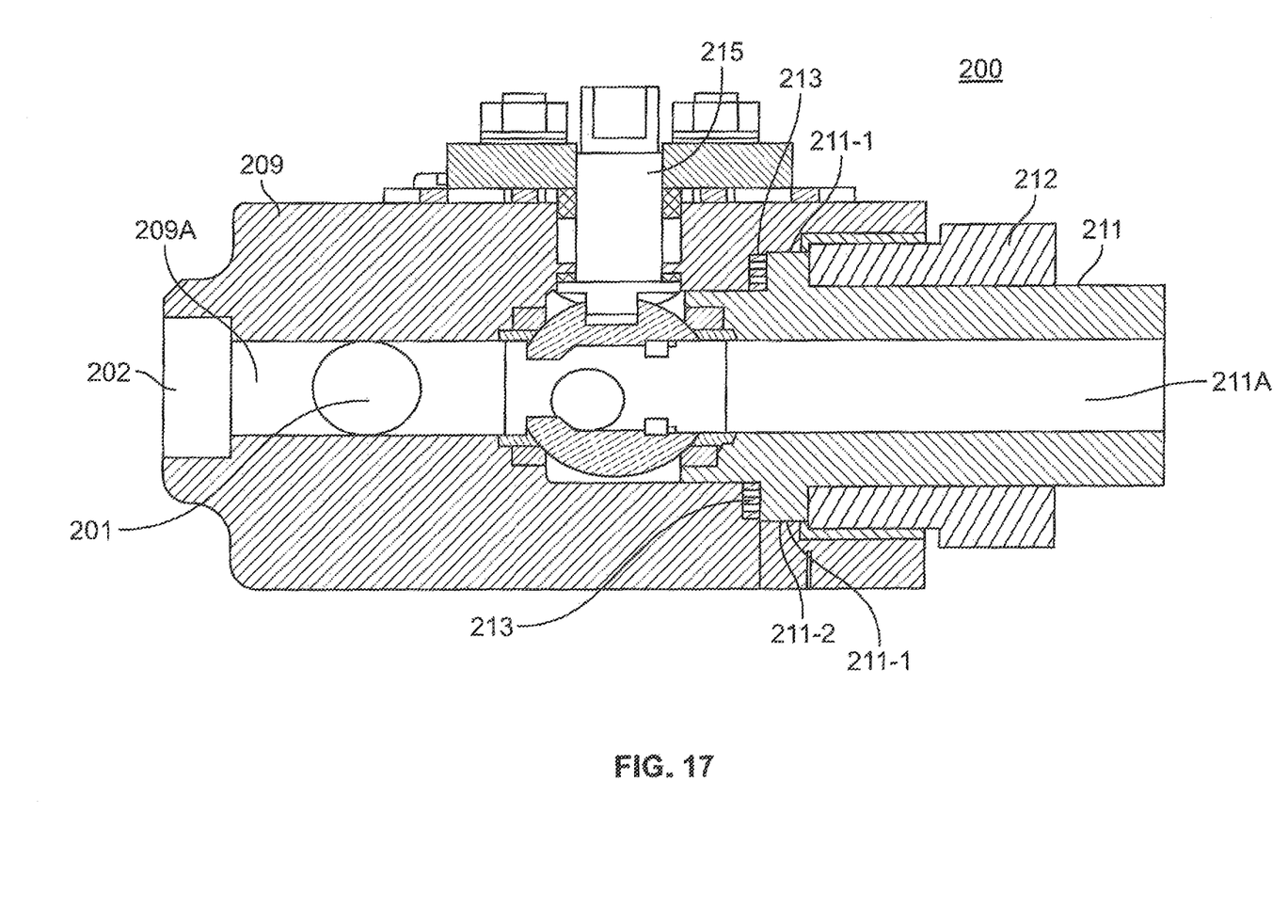
FIG. 17 is a side cross-sectional view of a right angle ball check valve 200 according to a second preferred embodiment of the invention, with the valve shown in the "Run" position.
Figure 18:
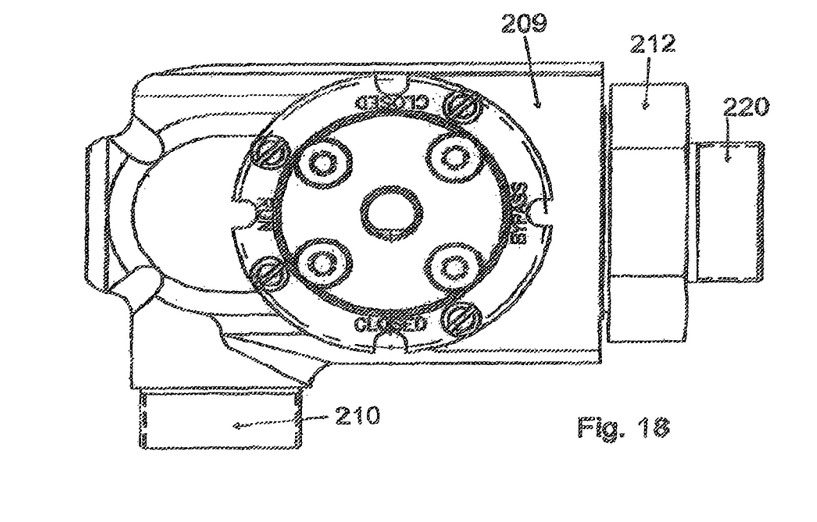
FIG. 18 is a top view of the ball check valve 200 according to the second preferred embodiment of the invention shown in FIG. 17.
Figure 19:
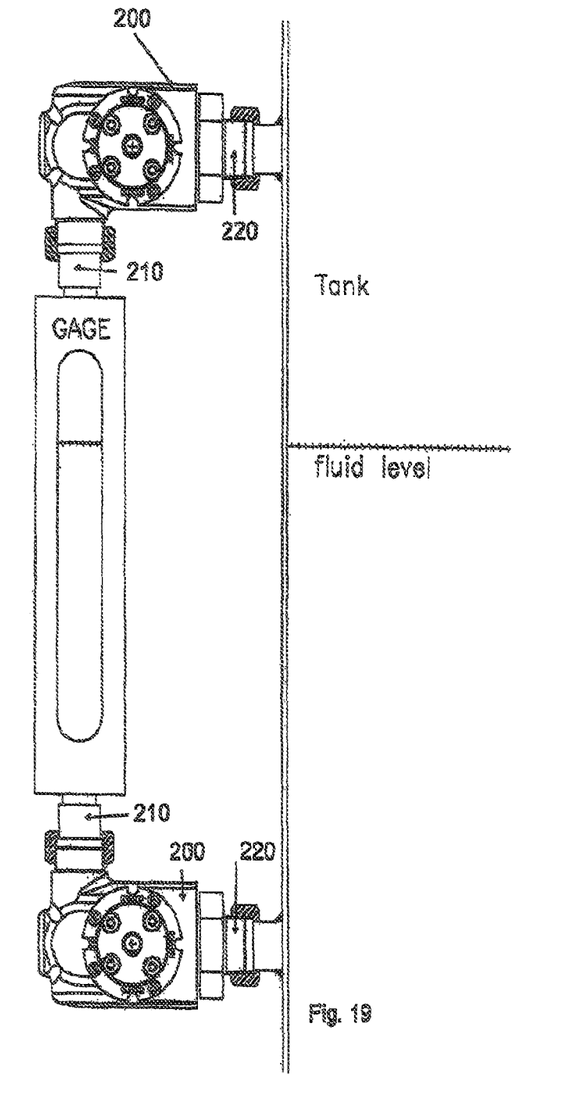
FIG. 19 is a side view of two ball check valves 200, in a system with a fluid tank and sight gage.

A ball check valve 200 according to a second preferred embodiment of the invention is shown in FIGS. 17-19. (Although the second preferred embodiment also has a handle, the handle is not shown in FIGS. 17-19 for clarity of illustration.) The ball check valve 200 of the second preferred embodiment has a few differences compared to the ball check valve 100 of the first preferred embodiment, but utilizes the same sphere 2 and other constituent parts as the ball check valve of the first preferred embodiment.

The ball check valve 200 has aligned fluid paths into and out of sphere 2. However, unlike the first preferred embodiment, fluid path 209A in ball check valve 200 is blocked at the end of body 209 by blocker 202 and has a fluid connection 201 that allows fluid to flow at a right angle to the fluid path 211A on the other side of sphere 2. FIG. 18 shows connection 210 at the exterior of the ball check valve 200 for the right angle fluid connection 201. Connection 210 is at right angles to fluid connection 220 out of ball check valve 200. Connections 210 and 220 may be union connections. Such a configuration enables two ball check valves 200 to directly connect a fluid tank and a vertical site gage as shown in FIG. 19 without additional piping required therebetween.

As seen in FIGS. 18 and 19, body 209 of ball check valve 200 differs from body 9 of ball check valve 100. Preferably, body 209 generally provides a rectangular or other substantially uniform exterior of ball check valve 200 that extends to the connections 210 and 220 rather than utilizing flanges as shown in FIGS. 1-3, 10 and 11 of the first preferred embodiment. Stem 215 in ball check valve 200 may have a greater length as compared to stem 15 in ball check valve 100 of the first embodiment so as to accommodate the larger dimension of body 209. But even in a ball check valve embodiment where the external fluid connections are aligned rather than at right angles, body 209 differs from body 9 in that it preferably engages with a unique locking end piece 211 so as to be better suited for high pressure or high temperature applications of ball check valve 200.

While right angle fluid connection 210 is preferably, but not necessarily, integrated with body 209, fluid connection 220 has a unique configuration. As shown in FIG. 17, locking end piece 211 contains the straight fluid path and is sized and dimensioned so as to securely fit within body 209. Two tabs 211-1 extend from the top and bottom of locking end piece 211. The tabs 211-1 have flat tops and bottoms 211-2 so as to prevent rotation of locking end piece 211 relative to body 209. Tabs 211-1 are thus restrained from rotation in body 209. A locking nut 212 moves locking end piece 211 so that tabs 211-1 are compressed tightly against washers or other sealing 213 on body 209. Thus, ball check valve 200 in the second preferred embodiment does not have the nuts 12 and studs 13 within body 9 and end piece 11 of the first embodiment. Thus, the second preferred embodiment provides greater structural integrity for body 209 and end piece 211 and enables the ball check valve 200 to be used for high pressure or high temperature applications.

What is claimed is:

1. A ball check valve, comprising:
    a sphere, the sphere having a flow passage therethrough;
    a ball check contained within the flow passage;
    a stem mated to the sphere and oriented to rotate about an axis perpendicular t the flow passage, a flat on a first end of said stem; and
    a handle with a flat cavity that mates in proper orientation with the flat on said stem, said handle rotating both of said stem and said sphere in common about said axis such that each one of a plurality of different orientations of said handle corresponds to a different respective orientation of said sphere, the ball check valve having a respectively different mode of operation for at least three of said plurality of different orientations,
    said stem has a tab which mates with a slot on the top of said sphere, said tab and said slot being offset from the common axis of said stem and sphere, said offset insures that said sphere, stem and handle can only be installed into said valve in one, correct, orientation,
    wherein the valve further comprises a locking plate, the locking plate defining at least three different positions for the valve, wherein the locking plate can only be installed on the valve in one, correct, orientation.

2. The ball check valve recited in claim 1, the locking plate having notches on the periphery thereof, the stem being connected to a handle with a moveable lock device which can interact with the notches on the periphery of the locking plate so as to secure the valve in one of the at least three different positions.

3. The ball check valve recited in claim 2, wherein the movable lock device comprises a sliding locking pin.

4. The ball check valve recited in claim 1, wherein the locking plate includes text associated with each one of the at least three different positions and the correct orientation is consistent with the text on the locking plate.

5. The ball check valve recited in claim 4, wherein the at least three different modes of operation for the valve comprise run, bypass and closed and the mode of operation can be determined visually from the text associated with each one of the at least three different positions.

6. The ball check valve recited in claim 5, wherein the valve has a retainer in circular form, the retainer having a member across its face providing a plurality of passages such that, when the valve is in the bypass mode of operation, the liquid may flow freely through the passages of the retainer but the ball check is held within the flow passage by the retainer.

7. The ball check valve as recited in claim 6, wherein the circular periphery of the retainer nests into a bore in the flow passage of the sphere, and a retainer clip is located in a groove adjacent to the retainer, the retainer clip securing the retainer from moving in the direction of the flow of liquid through the valve.

8. The ball check valve as recited in claim 7, wherein the retainer clip permits the retainer to rotate within the flow passage.

* * * * *